United States Patent
Deioma

(10) Patent No.: US 10,408,190 B2
(45) Date of Patent: Sep. 10, 2019

(54) WIND TURBINE WITH OPEN BACK BLADE

(71) Applicant: Robert B. Deioma, Garden Grove, CA (US)

(72) Inventor: Robert B. Deioma, Garden Grove, CA (US)

(73) Assignee: Robert B. Deioma

( * ) Notice: Subject to any disclaimer, the term of this patent is extended or adjusted under 35 U.S.C. 154(b) by 5 days.

(21) Appl. No.: 15/728,069

(22) Filed: Oct. 9, 2017

(65) Prior Publication Data

US 2018/0100484 A1   Apr. 12, 2018

Related U.S. Application Data

(60) Provisional application No. 62/405,449, filed on Oct. 7, 2016.

(51) Int. Cl.
| F03D 7/00 | (2006.01) |
| F03D 3/06 | (2006.01) |
| F03D 3/00 | (2006.01) |
| F03D 3/02 | (2006.01) |

(52) U.S. Cl.
CPC ............ *F03D 3/061* (2013.01); *F03D 3/005* (2013.01); *F03D 3/02* (2013.01); *F05B 2240/211* (2013.01); *F05B 2240/216* (2013.01); *Y02E 10/74* (2013.01)

(58) Field of Classification Search
CPC . F03D 3/061; F03D 3/005; F03D 3/02; F05B 2240/211; F05B 2240/216; F05B 303/062; Y02E 10/74

USPC ......................................................... 415/4.4
See application file for complete search history.

(56) References Cited

U.S. PATENT DOCUMENTS

| 346,797    | A | * | 8/1886 | Aylsworth ............ F03D 80/00 416/117 |
| 2,003,073  | A | * | 5/1935 | Faber ..................... B64C 11/16 416/231 B |
| 4,818,180  | A | * | 4/1989 | Liu ......................... F03D 7/06 416/117 |
| 5,198,156  | A | * | 3/1993 | Middleton .......... B01F 3/04531 261/87 |
| 5,246,342  | A | * | 9/1993 | Bergstein ............... F03D 3/061 415/4.4 |
| 5,316,443  | A | * | 5/1994 | Smith ................ B01F 7/00275 366/270 |
| 5,791,780  | A | * | 8/1998 | Bakker ............... B01F 3/04531 261/86 |

(Continued)

FOREIGN PATENT DOCUMENTS

| EP | 2594784    | 5/2013 |
| JP | 2012041861 | 3/2012 |

(Continued)

*Primary Examiner* — Hung Q Nguyen
*Assistant Examiner* — Anthony Donald Taylor, Jr.
(74) *Attorney, Agent, or Firm* — Fish IP Law LLP

(57) ABSTRACT

Turbine systems comprising at least one blade that (i) has a pocket to receive wind and (ii) a closed edge that cuts through the wind with greater efficiency are disclosed. The blades can be stacked along a central hub to increase the effective area of the turbine blade system. When stacked, the blades are spaced apart in an amount sufficient to allow wind to pass between the blades as the closed edge of the blade cuts through the wind thereby decreasing wind resistance.

10 Claims, 14 Drawing Sheets

(56) References Cited

U.S. PATENT DOCUMENTS

| | | | |
|---|---|---|---|
| 5,997,252 A | 12/1999 | Miller | |
| 7,084,523 B2 | 8/2006 | Noguchi | |
| 7,114,844 B2* | 10/2006 | Weetman | B01F 3/0478 366/328.3 |
| 8,277,114 B2* | 10/2012 | Higbee | B01F 3/04539 366/270 |
| 8,282,350 B2* | 10/2012 | Corrado | F03D 3/067 290/44 |
| 9,024,463 B2 | 5/2015 | Boone | |
| 9,051,918 B1 | 6/2015 | Hench et al. | |
| 9,074,580 B2 | 7/2015 | Curtis | |
| 9,133,823 B2* | 9/2015 | Jaw | F03D 3/067 |
| 2004/0105754 A1 | 6/2004 | Takahashi | |
| 2007/0160477 A1* | 7/2007 | Kneller | F03D 3/005 416/223 R |
| 2007/0177970 A1 | 8/2007 | Yokoi | |
| 2007/0189899 A1* | 8/2007 | Serpa | F03D 3/005 416/132 B |
| 2008/0273798 A1 | 11/2008 | Watkins | |
| 2009/0232654 A1* | 9/2009 | Andrews | F03D 3/02 416/124 |
| 2010/0104441 A1* | 4/2010 | Manley | F03D 3/065 416/200 R |
| 2010/0129219 A1* | 5/2010 | Grewal | F03D 3/02 416/128 |
| 2010/0150728 A1 | 6/2010 | Douglass et al. | |
| 2010/0158697 A1* | 6/2010 | Kim | F03D 3/005 416/243 |
| 2011/0091322 A1* | 4/2011 | Deeley | F03D 3/068 416/98 |
| 2011/0194938 A1 | 8/2011 | Livingston | |
| 2012/0039712 A1 | 2/2012 | Ueno | |
| 2012/0121380 A1* | 5/2012 | Tein | F03D 3/067 415/4.2 |
| 2012/0153632 A1* | 6/2012 | Suttisiltum | F03D 3/0427 290/55 |
| 2012/0211992 A1* | 8/2012 | Boone | F03D 3/005 290/55 |
| 2013/0028742 A1* | 1/2013 | Watanabe | F03D 3/005 416/219 R |
| 2013/0108458 A1* | 5/2013 | Goldstein | F03D 3/061 416/240 |
| 2014/0037454 A1 | 2/2014 | Aihara et al. | |
| 2014/0056708 A1* | 2/2014 | Samson | F03D 3/005 416/170 R |
| 2014/0294588 A1* | 10/2014 | Sarkar | F03D 3/02 416/200 R |
| 2015/0211482 A1* | 7/2015 | Radisek | F03D 3/061 416/135 |

FOREIGN PATENT DOCUMENTS

| | | | |
|---|---|---|---|
| KR | 1020110133979 | 12/2011 | |
| KR | 101183818 | 9/2012 | |
| SG | 177024 A1 * | 1/2012 | Y02B 10/30 |
| WO | 2013190117 | 12/2013 | |
| WO | 2015152073 | 10/2015 | |
| WO | 2016030523 | 3/2016 | |

* cited by examiner

WIND TURBINE WITH OPEN BACK BLADE

This application claims priority to U.S. Provisional Application No. 62/405,449, filed Oct. 7, 2017. All extrinsic materials identified herein are incorporated by reference in their entirety.

FIELD OF THE INVENTION

The field of the invention is vertical axis wind turbine systems.

BACKGROUND

The background description includes information that may be useful in understanding the present invention. It is not an admission that any of the information provided herein is prior art or relevant to the presently claimed invention, or that any publication specifically or implicitly referenced is prior art.

Turbine systems provide clean energy by harnessing energy of wind to produce power. These turbine systems are classified into two general categories: horizontal axis wind turbine systems and vertical axis wind turbine systems. A horizontal axis wind turbine system has a rotating axis that is horizontal and a vertical axis wind turbine system has a rotating axis that is vertical. Depending on at least the wind condition, vertical axis wind turbine systems are preferred where wind direction frequently changes because such systems can capture wind from various directions.

Many have contemplated vertical axis wind turbine systems. For example, vertical axis turbine systems have been disclosed by Kreye (EP2594784), Miller (U.S. Pat. No. 5,997,252), Noguchi (U.S. Pat. No. 7,084,523), Takahashi (US2004/0105754). These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Although many turbine systems have been disclosed, efficiency in turbine systems can be further improved. Thus, there is still a need in the art for improved turbine systems.

SUMMARY OF THE INVENTION

The inventive subject matter provides apparatus, systems, and methods in which the efficiency in turbine systems is improved. It is contemplated that turbine systems comprise at least one elongated blade that (i) has a pocket to receive wind and (ii) a closed edge that cuts through the wind with greater efficiency. The blades can be vertically stacked along a central hub to increase the effective area of the turbine blade system. When vertically stacked, the blades are spaced apart vertically in an amount sufficient to allow wind to pass between the blades as the closed edge of the blade cuts through the wind thereby decreasing wind resistance. Thus, turbine systems can be improved to provide increased efficiency.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventor has discovered that turbine systems can be improved to be more efficient. Contemplated turbine systems can comprise multiple blades coupled to a central hub that rotate about the center axis in a single level or plane in an action similar to a helicopter rotor. The levels or planes are stacked in multiple levels leaving spaces in between the various levels or planes to create a structure comprising blades and spaces between the blades. The blades are typically (i) hollow with an opening along a trailing edge, which creates a pocket to catch the wind, and (ii) with a closed leading edge to cut through the wind. Furthermore, the spaces between the blades allow the wind to pass as the leading edge cuts through the wind to thereby provide much greater efficiency.

In another aspect, contemplated turbine systems comprise multiple blades mounted between two support braces that spin on the central axis. The blades are mounted parallel to the center axis at a specified distance from the center axis in a stack like formation extending from the center axis while leaving a space between each of the blades. The blades are typically (i) hollow with an opening along a trailing edge, which creates a pocket to catch the wind, and (ii) with a closed leading edge to cut through the wind. The aerodynamic shape of the leading edge of the blades and the spaces between the blades allow the blades to cut through the wind more efficiently as the blades rotate.

Figure 1A:
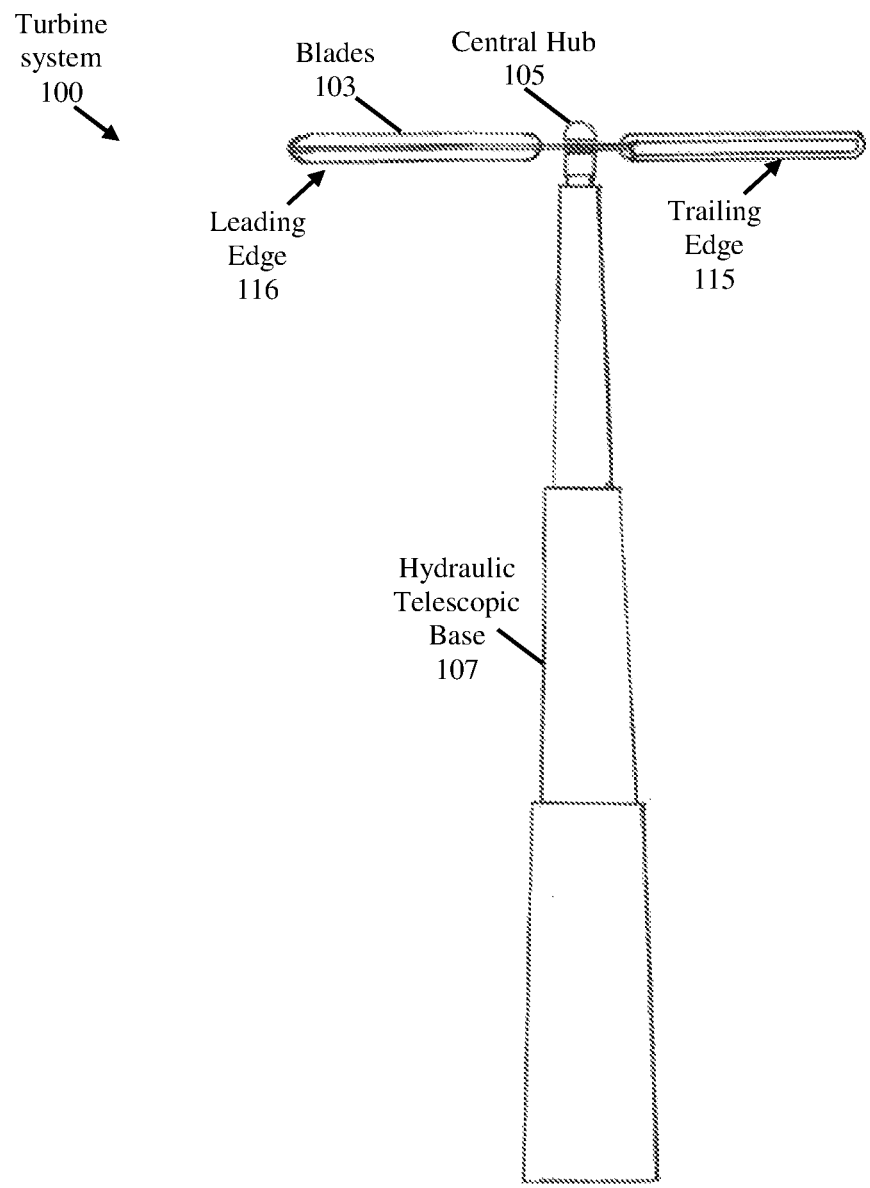
FIGS. 1A-1E are various views of an embodiment of a turbine system and its components.

It should be appreciated that contemplated turbine systems can be used for various applications, including, but not limited to, generating electricity, digging, drilling, milling, and pumping. FIG. 1A shows an embodiment of a turbine system 100 comprising a plurality of blades 103 disposed on a central hub 105. The plurality of blades 103 rotates about the central hub 105 by harnessing energy from the wind to generate electricity or produce work for other applications (e.g., digging, drilling, milling, pumping, etc.). As shown in FIG. 1A, the turbine system 100 can comprise a hydraulic telescopic base 107 that can extend and/or collapse to modify the height of the blades 103 with respect to the ground. Thus, the height of the blades 103 with respect to the ground can be modified to position the blades 103 at a height that would harness the most energy from the wind.

Figure 1B:
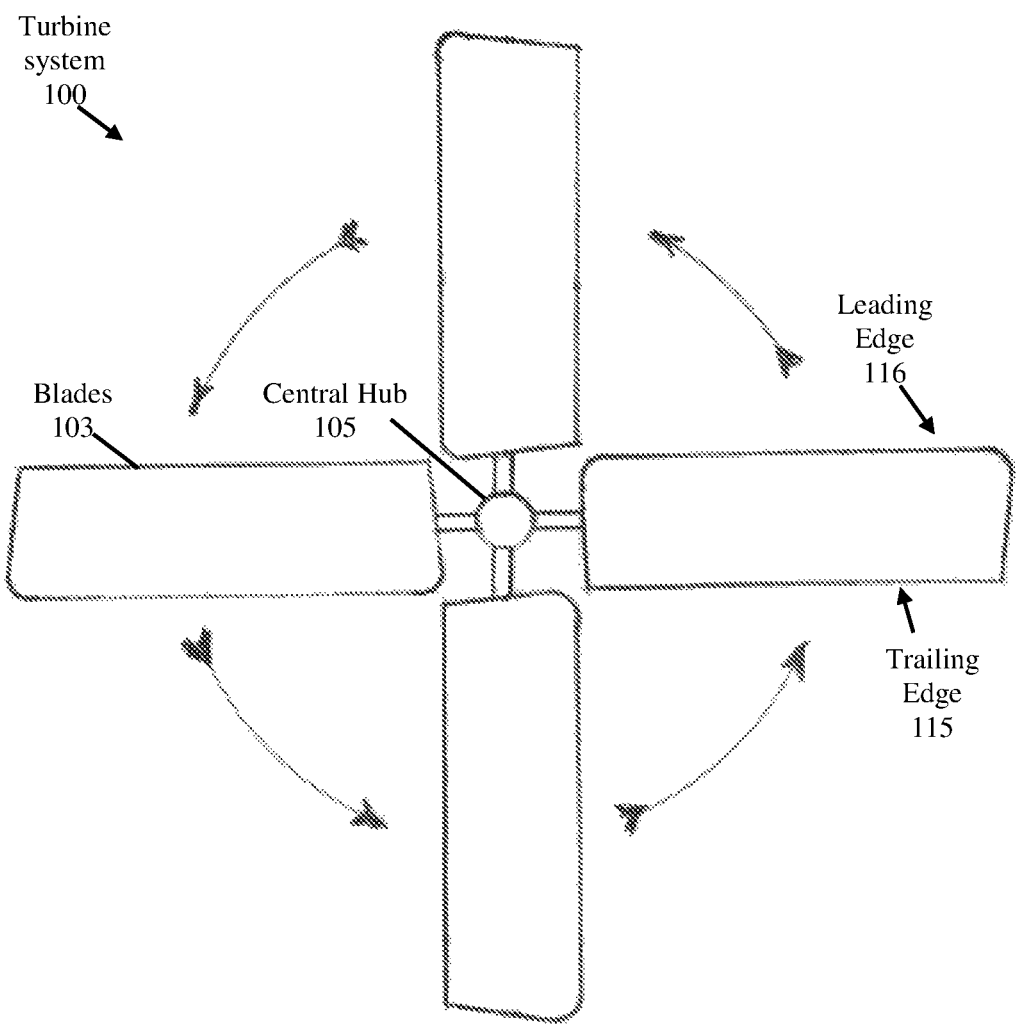

FIG. 1B shows a top view of the turbine system 100. The turbine system 100 comprises four blades 103 that are coupled to the central hub 105. It is contemplated that the turbine system 100 can include more or less blades 103. As shown in FIG. 1B, each blade is offset from the following blade and the previous blade by 90 degrees. However, the blades 103 can be offset from the following blade and the previous blade by other angles (e.g., between 30 and 120 degrees) in other contemplated embodiments. As the blades 103 capture the wind, the blades 103 rotate about the central hub 105 in a counterclockwise direction. However, in other embodiments, it is contemplated that blades 103 can rotate about central hub 105 in a clockwise direction.

Figure 1C:
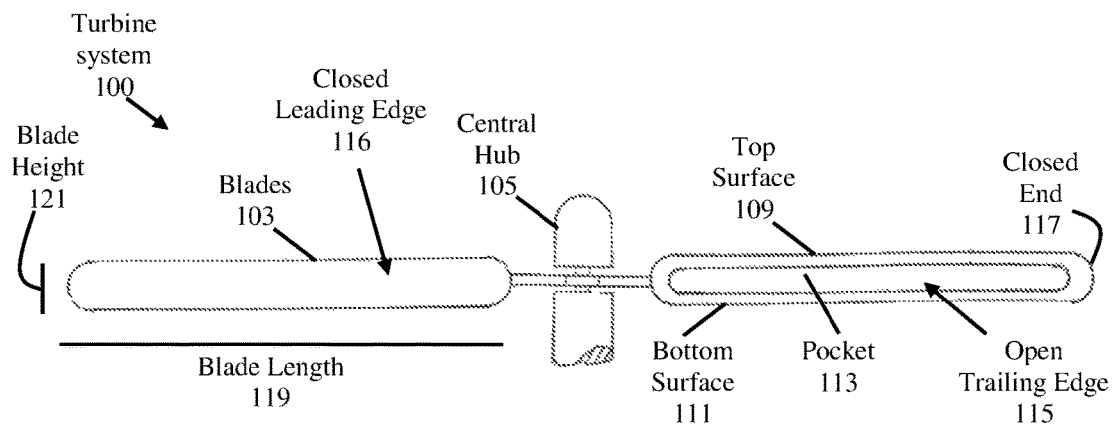

A side view of the top portion of the turbine system 100 is shown in FIG. 1C. The blades 103 are hollow and comprise a top surface 109 and a bottom surface 111 that partially define a pocket 113 along a trailing edge 115. The pocket 113 is sized and dimensioned to capture wind and thereby cause the blades 103 to rotate about the central hub 105. Typically, the pocket 113 extends throughout most of the length of the blade 103. For example, it is contemplated that the pocket 113 extends 50% to 99% of the length of the blade 103, 65% to 98% of the length of the blade 103, or 80% to 95% of the length of the blade 103. The blade 103 comprises a closed end 117 that is distal to the central hub 105. It should be appreciated that the closed end 117 controls the direction of the expulsion of air as it escapes the pocket 113 in order to make the system more efficient. It is contemplated that the blade 103 can comprise a plurality of pockets sized and dimensioned to capture wind. It should also be appreciated that the blades 103 comprise a closed leading edge 116 configured to cut through the wind.

Figure 1D:
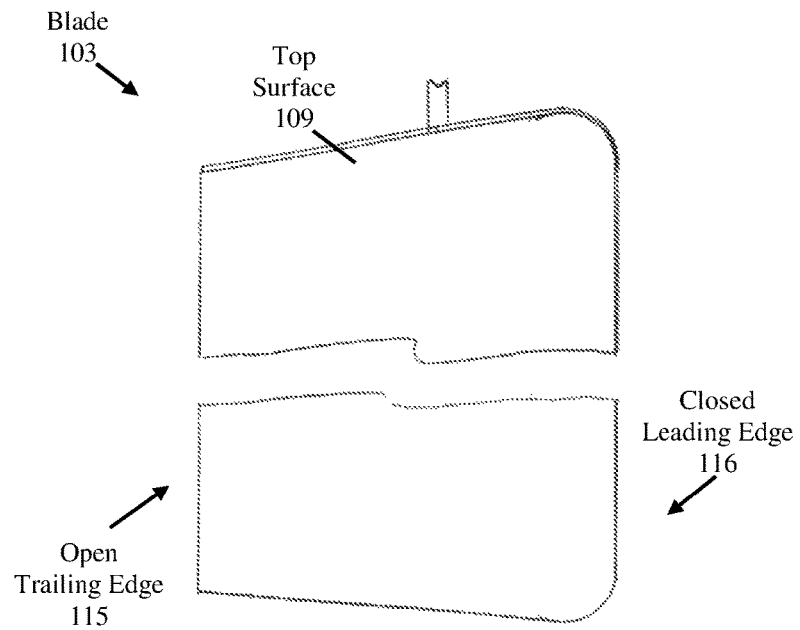

The top surface 109 and bottom surface 111 of the blade 103 extend away from the central hub 105 at a first distance to define a blade length 119, and the top surface 109 and bottom surface 111 are vertically separated to define a blade height 121. Preferably, the blade length 119 is greater than the blade height 121. For example, the blade length 119 can be between 2 to 25 times larger than the blade height 121, 2 to 15 times larger than the blade height 121, or 5 to 10 times larger than the blade height 121. The top surface of a blade 103 is shown in FIG. 1D.

Figure 1E:
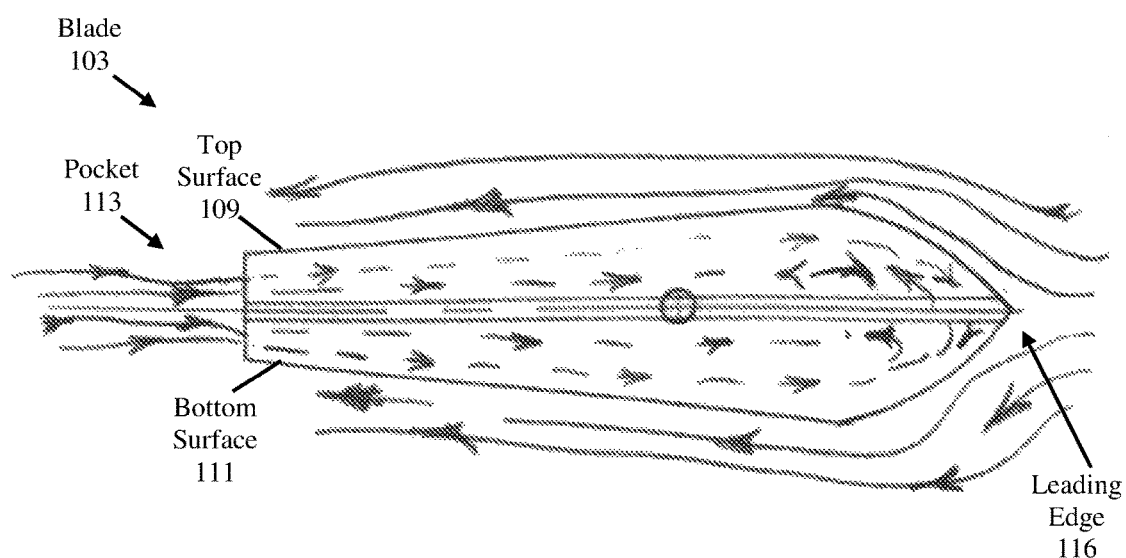

FIG. 1E shows an exemplary schematic of a blade 103 capturing wind. Wind enters the blade 103 through the pocket 113 and pushes on a front edge within the pocket 113 to propel the blade 103. The closed leading edge 116 of the blade 103 extends from a top surface 109 to a bottom surface 11 and is designed to cut through the wind. Thus, the pocket 113 increases wind resistance to propel the blade 103 and the leading edge 116 decreases wind resistance as the blades 103 rotate to collectively increase efficiently in the turbine system 100.

Figure 2A:
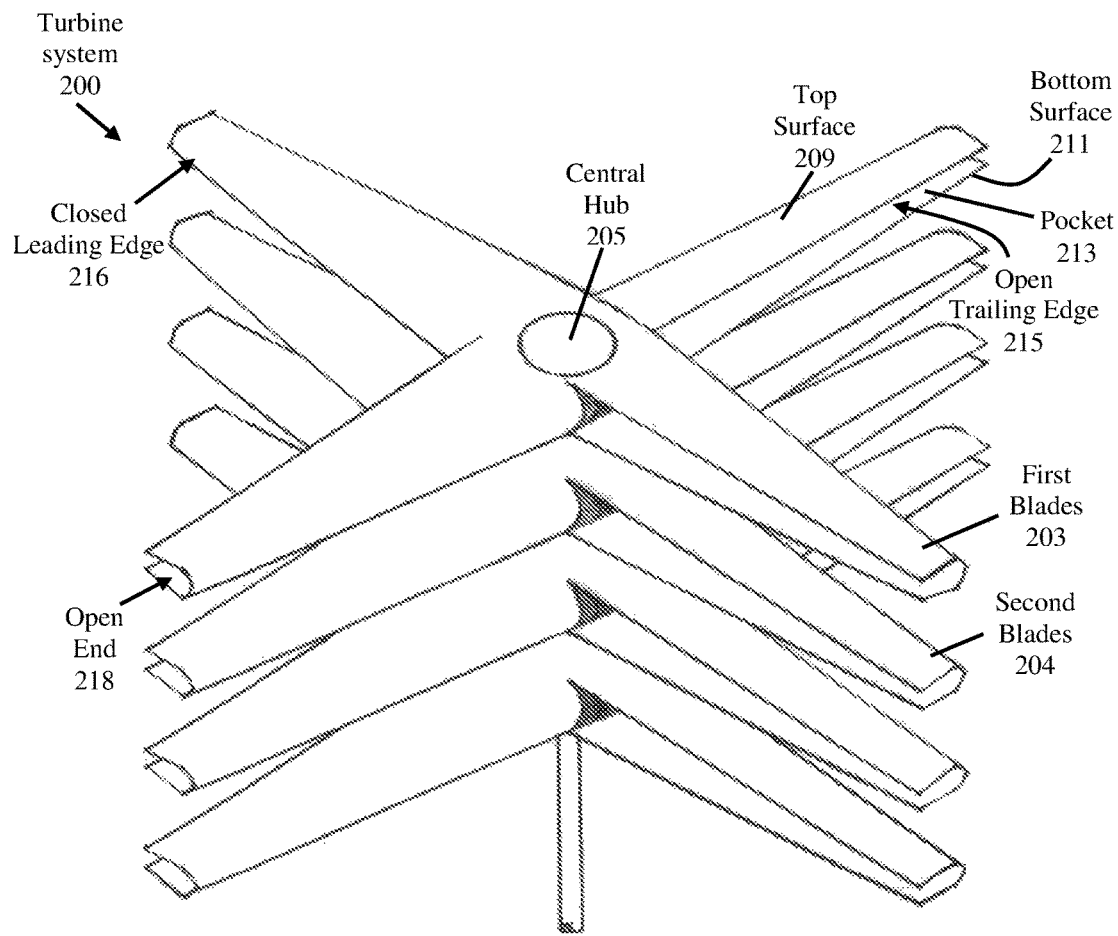
FIGS. 2A-2F are various views of another embodiment of a turbine system and its components.

Although the turbine system in FIGS. 1A-1E has a single set of blades, it is contemplated that additional sets of blades can be disposed along the central hub. FIG. 2A shows an embodiment of a turbine system 200 having multiple sets of blades at different heights along a central hub 205. The turbine system 200 comprises a first set of blades 103 coupled to the central hub 205 at a first height and a second set of blades 204 coupled to the central hub 205 at a second height. The first set of blades 203 comprise a top surface 209 and a bottom surface 211 that (i) extend away from the central hub 205 at a first distance to define a blade length, and (ii) are vertically separated by a second distance to define a blade height. Similarly, the second set of blades 204 comprise top and bottom surfaces that (i) extend away from the central hub 205 at a first distance to define a blade length, and (ii) are vertically separated by a second distance to define a blade height. Preferably, the blade length of the first set of blades 203 and/or the second set of blades 204 is greater than the blade height. It is contemplated that the blade length of the first set of blades 203 and/or the second set of blades 204 is between 2 to 25 times larger than the blade height, 2 to 15 times larger than the blade height, or 5 to 10 times larger than the blade height.

The first set of blades 203 comprise a closed leading edge 216 that extends from the top surface 209 to the bottom surface 211. The leading edge 216 is aerodynamically designed to cut through the wind and decrease wind resistance. The first set of blades 203 further comprise an opening along a trailing edge 215 creating a pocket 213 that is at least partially defined by the top 209 and bottom surfaces 211 and the edge 216. It is contemplated that the pocket 213 is sized and dimensioned to receive wind to propel at least the first set of blades 203. Similarly, the second set of blades 204 comprises (i) a closed leading edge that is aerodynamically designed to cut through wind and decrease wind resistance, and (ii) a trailing edge creating a pocket that receives wind to propel at least the second set of blades 204. It is contemplated that each set of blades is propelled independently from one another (i.e., the pockets of an individual set of blades are used to propel the set of blades to which they belong) or collectively propel all the sets of blades (i.e., the pockets of each set of blades collectively propel the blades in all the sets). Thus, as described above, the turbine system comprises blades with pockets disposed on the trailing edges to increase wind resistance and propel the blades, and closed leading edges that decrease wind resistance as the blades rotate to thereby collectively increase efficiency.

The different sets of blades are vertically separated by the same distance throughout the central hub 105 in FIG. 2A. However, it is also contemplated that the different sets of blades can be separated by different distances along the central hub 205. Typically, the different sets of blades are vertically separated by a distance equal to the blade height. It is contemplated that the different sets of blades can be separated by a distance greater or lesser than the blade height. The blades can comprise an open end 218 that is distal to the central hub 205. It is contemplated that the open end 218 can be effective in releasing stagnant air within the pocket. It should be appreciated that the vertical spaces between the different sets of blades allows wind to pass through the turbine system as the leading edge of the various sets of blades cuts through the wind to improve efficiency.

Figure 2B:
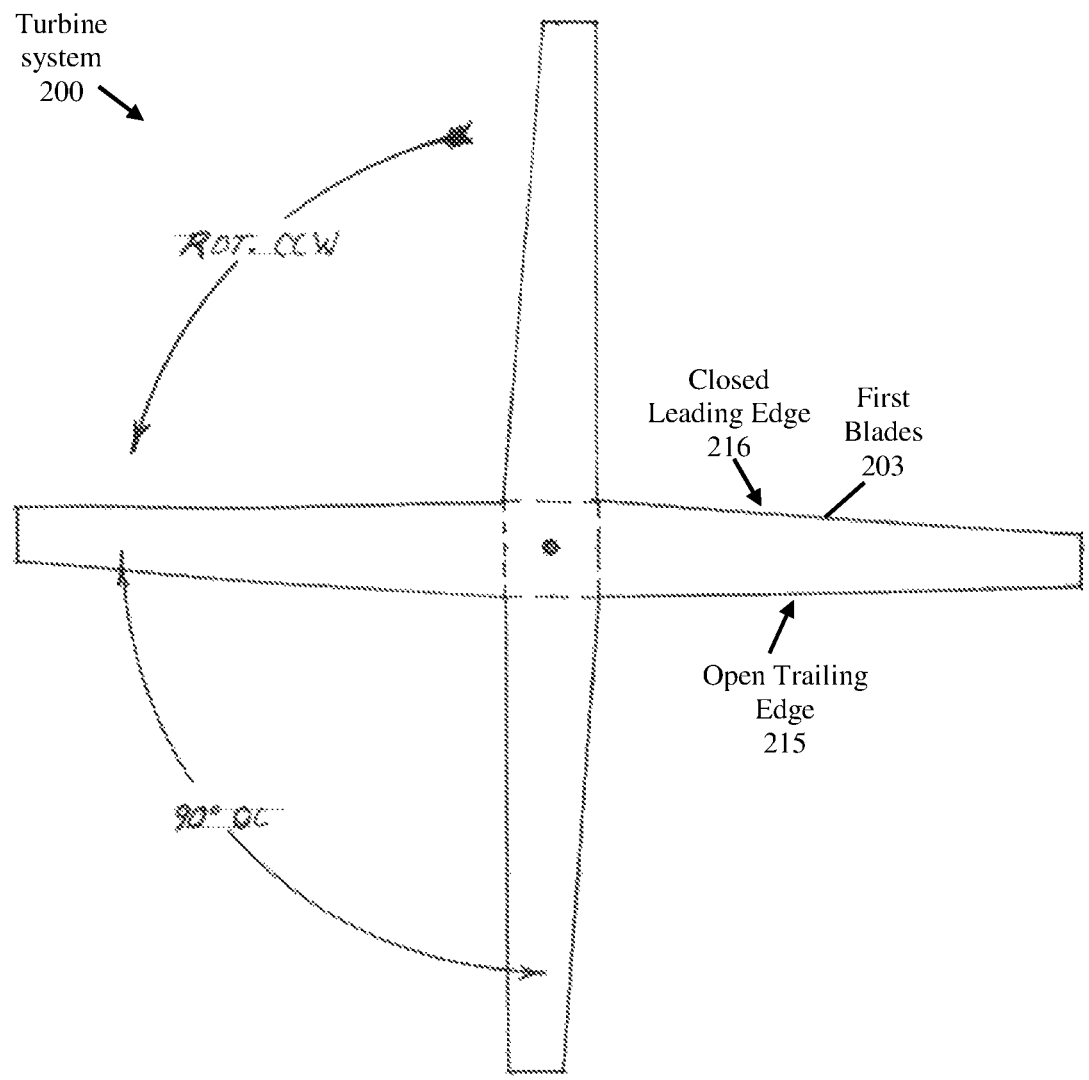
Figure 2C:
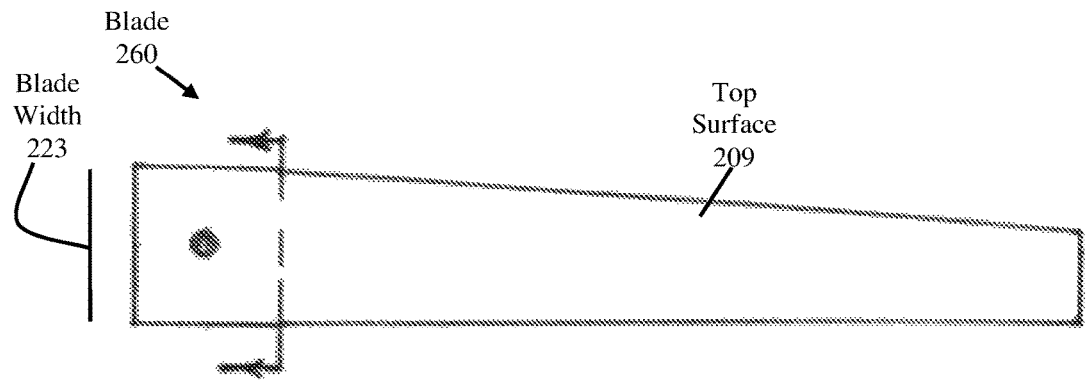

FIG. 2B shows a top view of the first set of blades 203. Similar to the turbine system shown in FIGS. 1A-1E, the first set of blades 203 comprises four blades that are offset from adjacent blades by 90 degrees. It is contemplated that this turbine system 200 can comprise more or less blades and/or the blades can be offset by greater or lesser than 90 degrees. FIG. 2C shows a top view of a blade 260 of the turbine system 200. The blade 260 has a width 223 that gradually decreases as it extends away from the central hub 205. In other embodiments, the blade 260 can have a constant width along its length 229.

Figure 2D:
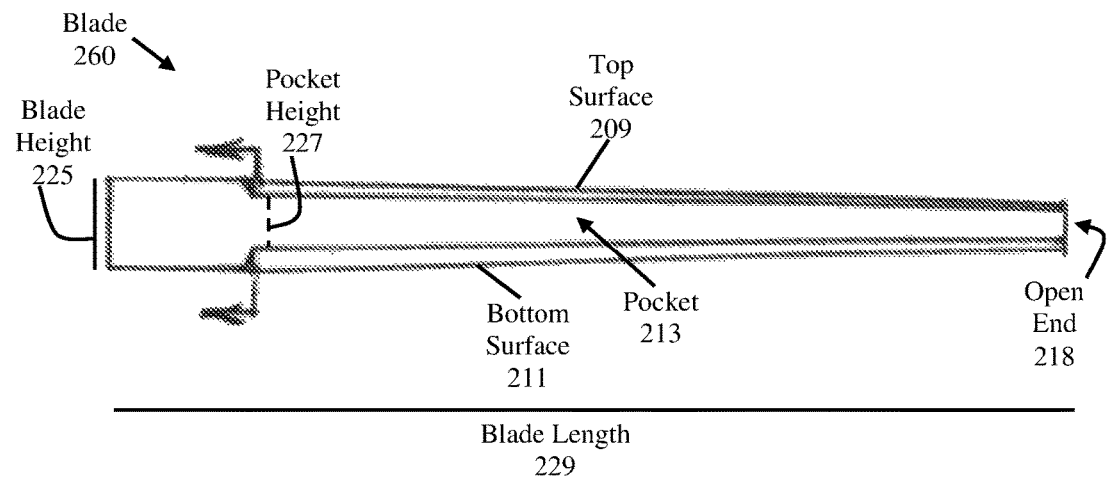
Figure 2E:
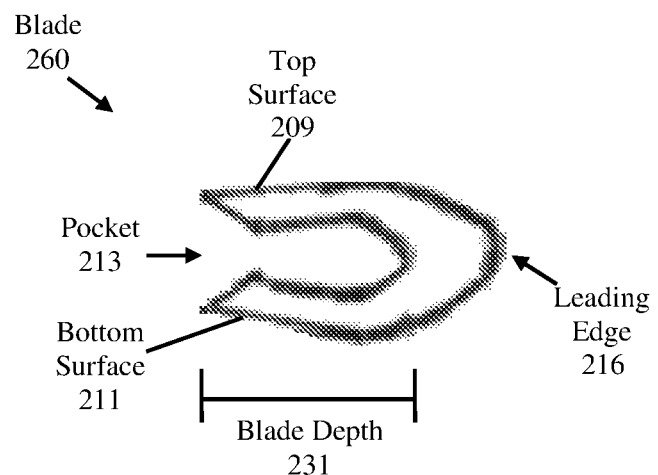
Figure 2F:
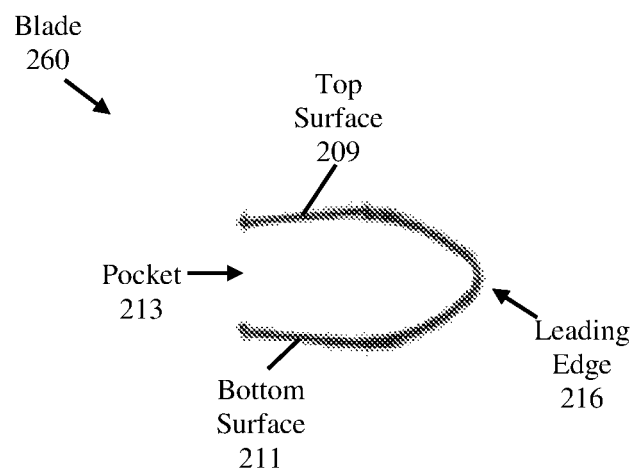

FIG. 2D is a side view of the blade 260. The pocket 213 of the blade 260 decreases in height (pocket height 227 indicated by the dotted line in FIG. 2D) as it extends away from the central hub. At the distal end of the blade is an open end 218. The pocket 213 of the blade 260 captures wind to propel the blade 260. FIG. 2E is an end view of the blade 260 viewing the blade 260 through the open end 218. As shown, the blade 260 can comprise a "C"-shaped cross section sized and dimensioned to receive wind. The leading edge 216 of the blade 260 on the opposite side of the pocket 213 is aerodynamically designed to cut through the wind as the blade 260 rotates. The blade 260 comprises a blade depth 231 measured from the leading edge 216 of the pocket 213 to the trailing edge 215 of the blade 260 that can also gradually decrease as the blade 260 extends away from the central hub 205. It should be appreciated that a gradual decrease in at least one of the pocket height 227 and the blade depth 231 make the blade more aerodynamic by allowing (i) a buildup of pressure inside the blade and (ii) expulsion of the air within the blade 260 as the air flows across the length 229 of the blade 260 to open end 218 (i.e., as the air flows into the pocket 213 and through the pocket 213 to the open end 218). FIG. 2F shows a cross-sectional view along the double arrows of FIGS. 2C and 2D.

Figure 3A:
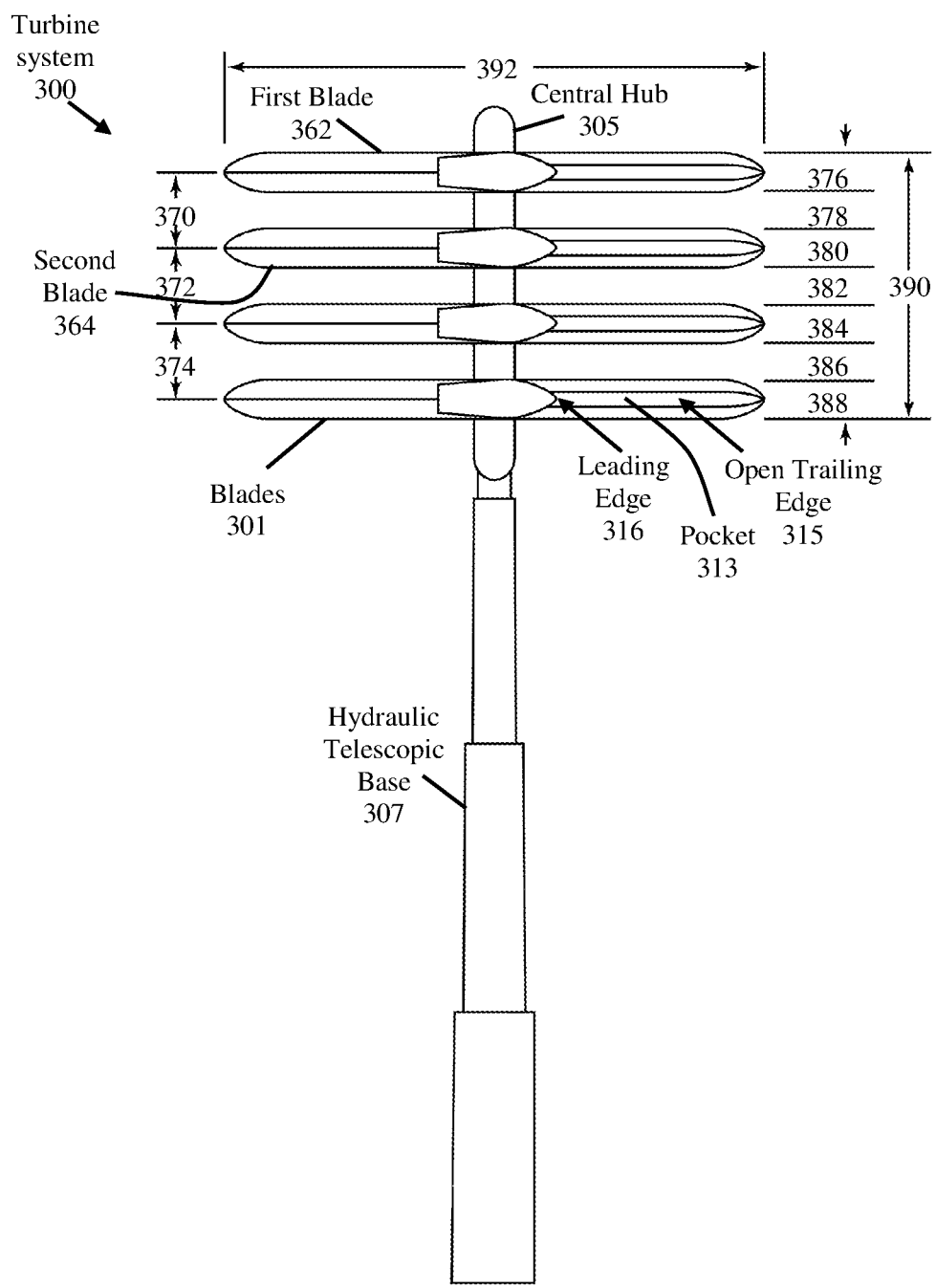
FIGS. 3A-3C are various views of another embodiment of a turbine system and its components.

Another embodiment of a turbine system 300 is shown in FIG. 3A. The turbine system 300 comprises various sets of blades 301 disposed on a central hub 305. The blades 301 comprise a closed leading edge 316 and an opening along a trailing edge 315 that creates a pocket 313 as described in the other embodiments above. It is contemplated that a first set of blades comprising a first blade 362 can be coupled to the central hub 305 at a first height, and a second set of blades comprising a second blade 364 can be coupled to the central hub 305 at a second height. Typically, the first and second heights are separated by at least the height of a blade. It should be appreciated that the vertical separation between the adjacent sets of blades in the turbine system can also be separated by at least the height of a blade.

The vertical separation between the various sets of blades can be the same (i.e., all adjacent sets of blades separated by the same distance) or different (i.e., adjacent sets of blades separated by different distances throughout turbine system 300). For example, it is contemplated that distances 378, 382 and 386 separating the various sets of blades are the same. However, in other embodiments, at least one distance of distances 378, 382 and 386 can be different from the others. Additionally, or alternatively, it is contemplated that the blade heights 376, 380, 384 and 388 are the same. In other embodiments, at least one blade height of blade heights 376, 380, 384 and 388 can be different from the others. It is contemplated that distances 378, 382 and 386 and blade heights 376, 380, 384 and 388 can be the same height. For example, it is contemplated that distances 378, 382 and 386 and blade heights 376, 380, 384 and 388 can each be equal to one foot to provide a combined height 390 of seven feet. In such embodiment, it is contemplated that turbine system 300 can comprise a width 392 of 14 feet and/or the center to center heights 370, 372 and 374 can each be two feet. Additionally, or alternatively, it is contemplated that width 392 is at least 2 times larger than combined height 390.

The turbine system 300 can comprise a hydraulic telescopic base 307 that can adjust the height of the sets of blades to maximize the energy harnessed from the wind. It is contemplated that the hydraulic telescopic base 307 can extend or collapse to collectively adjust the height of the blades. However, in other embodiments, the hydraulic telescopic base 307 can adjust the height of individual sets of blades to alter the vertical separation between a first set of blades and a second set of blades.

Figure 3B:
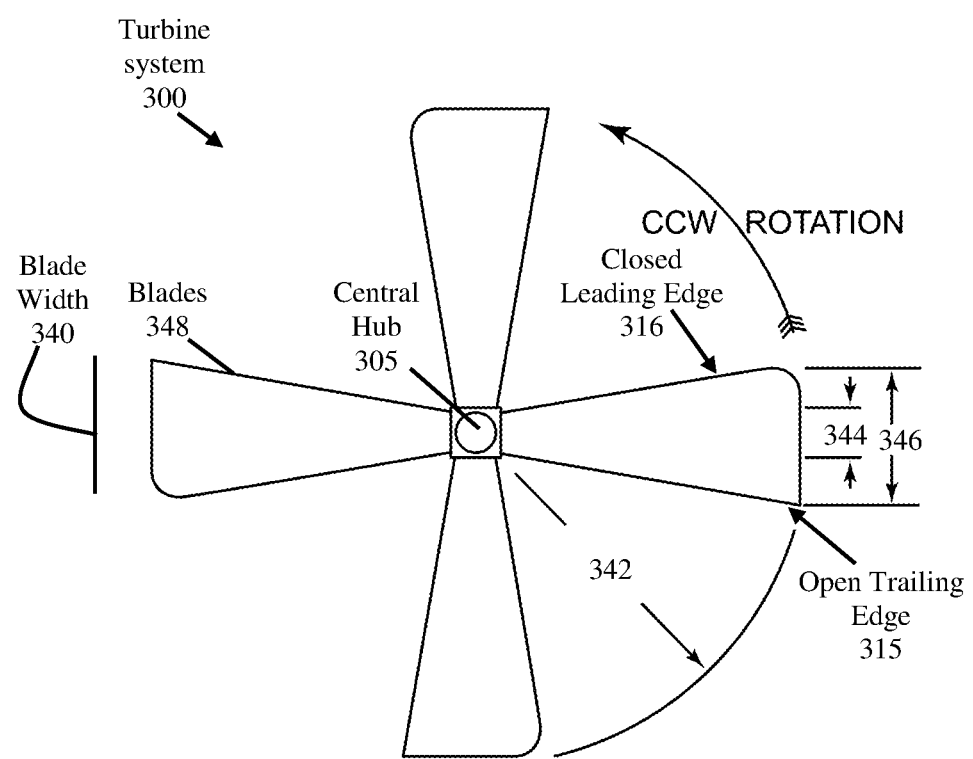

FIG. 3B shows a top view of a set of blades 348. Unlike the other embodiments discussed above, the width 340 of the blades 348 gradually increases as it extends away from the central hub 305. For example, the blade can have a first width 344 (e.g., 1 ft) at a first end proximal to the central hub 305 that gradually increases to a second width 346 (e.g., 3 ft) at a second end. It is contemplated that second width 346 is at least three times larger than first width 344. For example, second width 346 can be 3, 5, 10, 25, or 50 times larger than first width 344. It is further contemplated that the blades 348 can gradually increase from first width 344 to second width 346. For example, blades 348 can gradually increase from first width 344 to second width 348, such that second width 348 is between 0.5 and 10 times larger than the first width 344 or between 1 and 5 times larger than the first width 344.

It is contemplated that the flared design of the blades (i.e., blades with gradually increasing widths) are expected to perform with higher efficiency due to lower drag and better aerodynamics. The lower drag is deemed to provide laminar flow around the blade tip, which is critical for high tip speed ratio (TSR) of the blade. High TSR is preferred to produce high enough power for maximum wind harvesting. However, high TSR is also accompanied with high flow turbulence which is unfavorable for blade performance. Thus, a flared component incorporated around the blade tip corner facilitates laminar flow by reducing flow turbulence intensity locally.

Figure 3C:
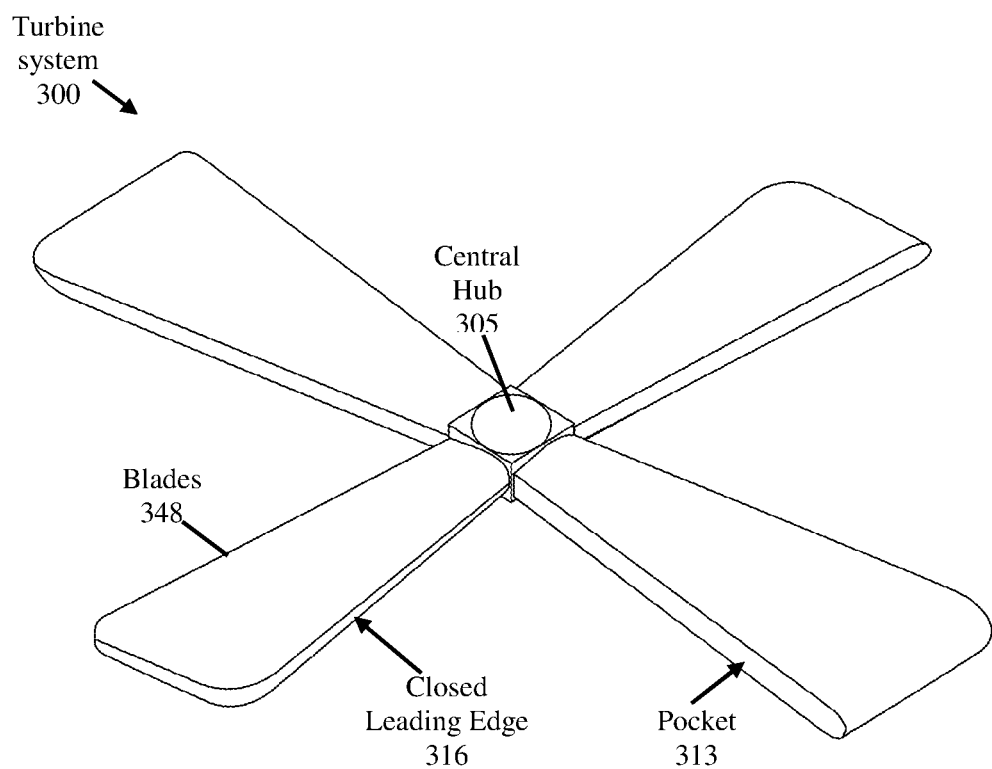

A perspective view of set of blades 348 is shown in FIG. 3C. As discussed above, the blades 348 comprise an opening along the trailing edge, which creates a pocket 313, and a closed leading edge 316 that collectively improve the efficiency of the turbine system. The turbine system 300 collects wind in the pocket 313 to propel the blades 348 while the leading edge 316 of the blades 348 cuts through the wind to decrease wind resistance as the blades 348 rotate. The set of turbine blades 348 comprises four blades in this embodiment. However, it is contemplated that the set of blades 348 can include more or less blades.

Figure 4A:
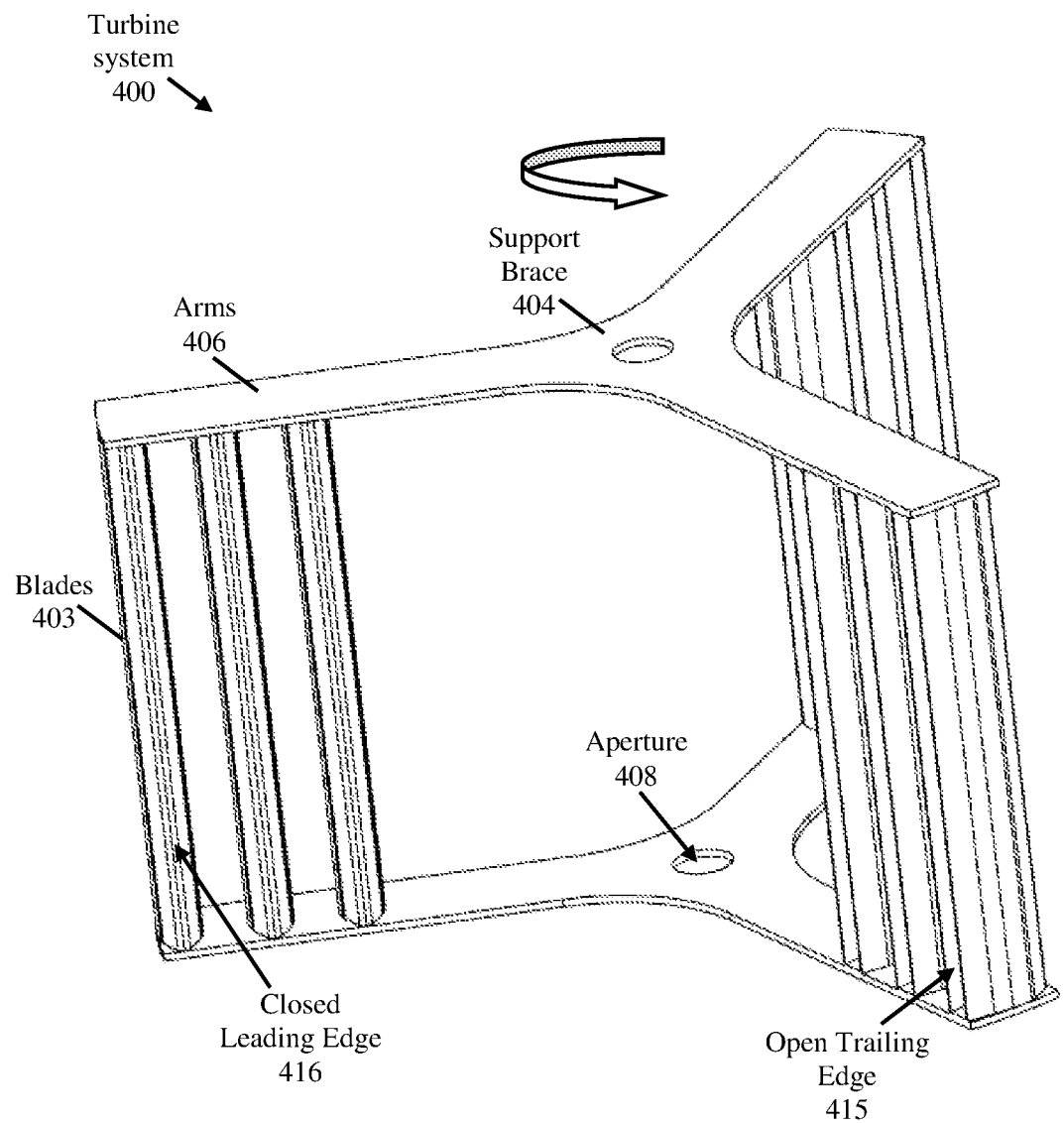
FIGS. 4A-4C are various views of another embodiment of a turbine system and its components.

In another aspect, a turbine system 400 can comprise blades 403 that are parallel to the central hub as shown in FIG. 4A. The turbine system 400 comprises various sets of blades 403 mounted onto support braces 404. The support brace 404 can comprise a plurality of arms 406 and an aperture 408 sized and dimensioned to couple a central hub. Typically, the arms 406 extend away from the aperture 408 and/or the central hub.

The blades 403 are disposed between the arms 406 of the support brace 404. It is contemplated that a single blade or many blades can be disposed on an arm 406 of a support brace 404. For example, turbine systems can comprise between one and 10 blades per arm 406 or between one and five blades per arm 406. It is contemplated that the blades in a set of blades 403 are horizontally separated by at least one blade width. However, the blades in a set of blades 403 can be separated by less than a blade width in other embodiments. Blades 403 can comprise a closed leading edge 416 and an open trailing edge 415 having a pocket to thereby collect wind and propel blades 403.

Figure 4B:
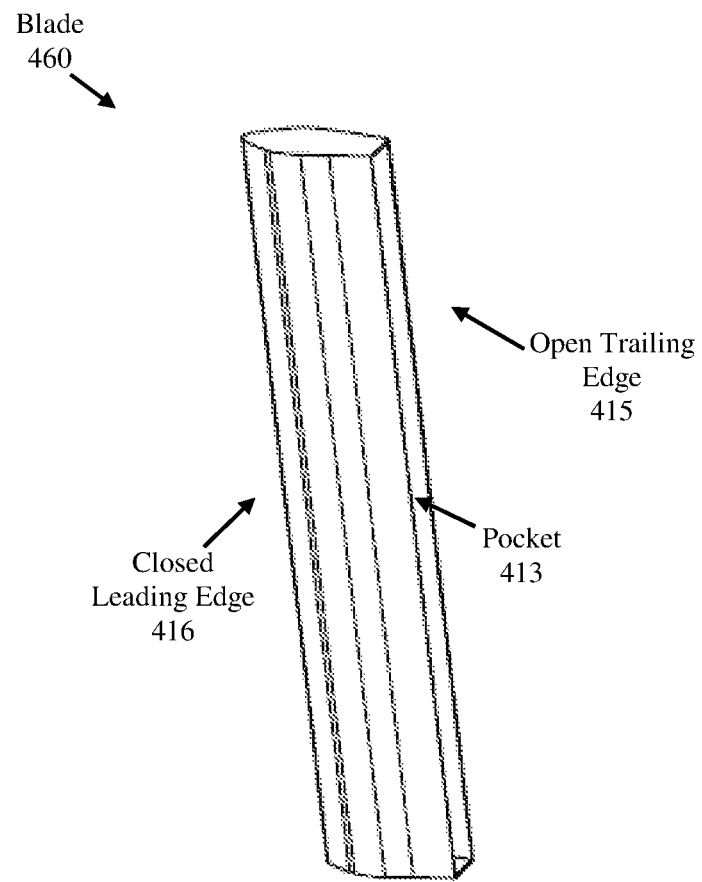
Figure 4C:
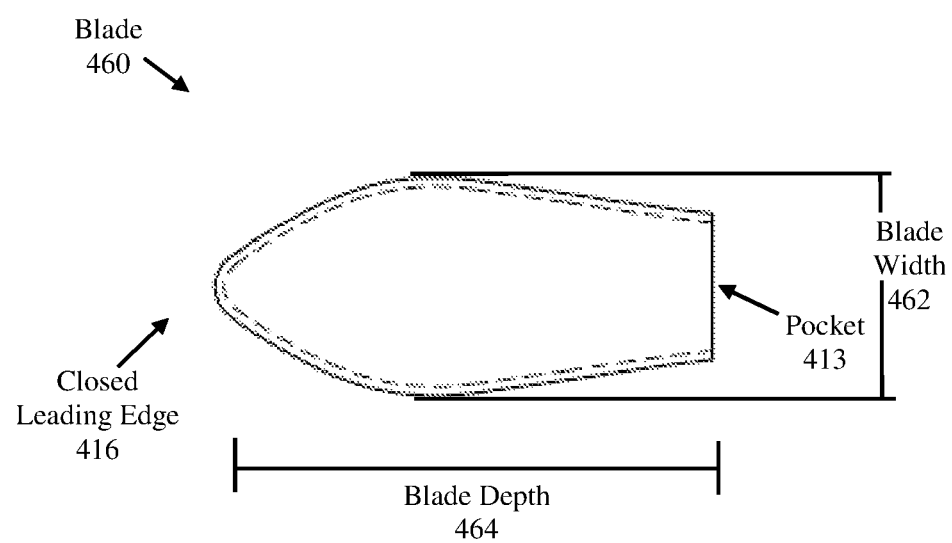

FIG. 4B shows a blade 460 of the turbine system 400. The blade 460 comprises a closed leading edge 416 and an opening along the trailing edge 415, which creates a pocket 413 to catch the wind. Similar to the blades discussed in the above embodiments, the closed edge 416 and pocket 413 can collectively increase the efficiency of the turbine system. The pocket 413 is sized and dimensioned to capture wind to propel the blade 460 and the leading edge 416 is configured to cut through the wind to thereby decrease wind resistance as the blade 460 rotates. FIG. 4C shows a top view of the blade 460 having the pocket 413 and the closed leading edge 416. The blade 460 comprises a width that increases from the pocket 413 to a blade width 462 between the pocket and the edge, and then the width decreases in size to the leading edge 416. The blade 460 also comprises a blade depth 464 measured from the open trailing edge 415 to the closed leading edge 416 that is sized and dimensioned to receive wind.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A turbine system, the turbine system comprising:
    a vertically disposed central hub; and
    a plurality of blades extending radially and horizontally from the central hub, wherein the plurality of blades includes:
        a first blade coupled to the central hub at a first height, the first blade defined by a top surface and a bottom surface, the top and bottom surfaces extending horizontally from the central hub for a first distance so as to define a length of the first blade, wherein the top and bottom surfaces are connected to one another at a closed leading edge of the first blade and are vertically separated from one another by a second distance so as to define a height of a first pocket at an open trailing edge of the first blade, the first pocket running the length, width, and depth of the first blade such that the second distance defining the height of the first pocket at the open trailing edge of the first blade is smaller than the first distance defining the length of the first blade; and
        a second blade coupled to the central hub at a second height that is different from the first height, the second blade defined by respective top and bottom surfaces, the top and bottom surfaces extending horizontally from the central hub for a third distance so as to define a length of the second blade, wherein the top and bottom surfaces are connected to one another at a closed leading edge of the second blade and are vertically separated from one another by a fourth distance so as to define a height of a second pocket at an open trailing edge of the second blade, the second pocket running the length, width, and depth of the second blade such that the fourth distance defining the height of the second pocket at the open trailing edge of the second blade is smaller than the third distance defining the length of the second blade,
    wherein each of the first blade and the second blade are structured such that along the depth of the blade, the width of the blade gradually increases in both an upward and a downward direction from the closed leading edge and toward the open trailing edge and then gradually decreases in both the upward and the downward direction until reaching the open trailing edge so as to form the respective first and second pockets defined therein, the first blade and the second blade being arranged such that when the respective blades are stacked one above or below another, an aerodynamic space defined by the respective blade structures is formed therebetween to allow wind to pass therethrough.

2. The turbine system of claim 1, wherein a height difference between the first height and the second height is equal to or greater than the second distance or the fourth distance.

3. The turbine system of claim 1, wherein the first distance is between 2 to 15 times larger than the second distance.

4. The turbine system of claim 1, wherein the first distance is between 5 to 10 times larger than the second distance.

5. The turbine system of claim 1, wherein the third distance is between 2 to 15 times larger than the fourth distance.

6. The turbine system of claim 1, wherein the third distance is between 5 to 10 times larger than the fourth distance.

7. The turbine system of claim 1, wherein the first blade comprises an open end that is distal to the Central hub.

8. The turbine system of claim. 7, wherein the second blade comprises an open end that is distal to the central hub.

9. The turbine system of claim 1, wherein the second blade comprises a closed end distal to the central hub.

10. The turbine system of claim 1, wherein the first blade comprises a closed end distal to the central hub.

* * * * *